United States Patent
Simmons (10) Patent No.: US 7,908,458 B2
(45) Date of Patent: Mar. 15, 2011

(54) ETHERNET CONTROLLER

(75) Inventor: Michael Simmons, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 655 days.

(21) Appl. No.: 11/944,058

(22) Filed: Nov. 21, 2007

(65) Prior Publication Data
US 2009/0132751 A1    May 21, 2009

(51) Int. Cl.
*G06F 9/26* (2006.01)
(52) U.S. Cl. ........................................... 711/220
(58) Field of Classification Search .................. None
See application file for complete search history.

(56) References Cited

U.S. PATENT DOCUMENTS

| | | | | |
|---|---|---|---|---|
| 5,640,399 A | * | 6/1997 | Rostoker et al. | 370/392 |
| 5,805,927 A | * | 9/1998 | Bowes et al. | 710/23 |
| 5,963,543 A | * | 10/1999 | Rostoker et al. | 370/232 |
| 6,192,463 B1 | | 2/2001 | Mitra et al. | 712/43 |
| 2004/0160972 A1 | | 8/2004 | Tang et al. | 370/412 |
| 2005/0013319 A1 | | 1/2005 | Kenkare | 370/463 |
| 2005/0268137 A1 | | 12/2005 | Pettey | 713/400 |

FOREIGN PATENT DOCUMENTS

| GB | 2360666 | 9/2001 |
|---|---|---|
| WO | 0058828 | 10/2000 |

OTHER PUBLICATIONS

International Search Report and Written Opinion for Application No. PCT/US2008/084371 (13 pages), Mar. 5, 2009.
International Search Report and Written Opinion for Application No. PCT/US2008/084375 (12 pages), Mar. 26, 2009.
International Preliminary Report on Patentability for Application No. PCT/US2008/084375 (7 pages), Jun. 3, 2010.

* cited by examiner

*Primary Examiner* — Brian R Peugh
(74) *Attorney, Agent, or Firm* — King & Spalding L.L.P.

(57) ABSTRACT

A controller, in particular an Ethernet controller has a control unit operable to receive commands and data through an I/O interface; a plurality of registers arranged in a register block which is divided into a plurality of register banks, wherein at least one register controls a function of the controller; a register address unit having logic for accessing one of the plurality of registers by a plurality of addressing schemes, wherein the addressing schemes at least has a direct address provided by received data, a combined address provided by a partial address from a received command and a bank address stored in a bank register, and an address selected form a plurality of predetermined addresses through a received command.

25 Claims, 4 Drawing Sheets

ETHERNET CONTROLLER

TECHNICAL FIELD

The technical field of the present application relates to Ethernet controllers.

BACKGROUND

Ethernet controllers, in particular stand alone Ethernet Controllers, are designed to serve as an Ethernet network interface for any type of microprocessor or microcontroller. Such a controller can have a fairly large memory and may include a dedicated interface such as a serial peripheral interface (SPI) bus. In some embodiments, such an Ethernet controller may also be integrated in a microcontroller using the SPI bus or any other capable interface connection. The Ethernet controller handles all communication protocols and comprises a large buffer for intermediate storage of incoming and outgoing messages. The stand alone or integrated Ethernet controller handles coordination of incoming and outgoing data packets as well as packet filtering. It may further comprise an internal direct memory access (DMA) module for fast data throughput and hardware assisted checksum calculation. The communication of an Ethernet controller with a microcontroller or microprocessor can be established interrupt driven. A microcontroller or microprocessor may communicate and control the Ethernet controller via the SPI interface. To this end, the Ethernet controller comprises a system control unit that interprets ands executes a limited amount of commands received through the interface. Many control functions can be provided through a plurality of control registers. In an Ethernet controller with an SPI interface, a commands are 8-bit wide and, thus, only a limited number of bits, for example five bits, can be used to address a register. However, this allows only access to 32 different registers. If an Ethernet controller has, for example, over a hundred registers, direct access to all registers requires more than one command byte. To provide fast read and write access to the registers, a banking scheme is often used. However, each bank is limited in the number of registers and important registers that need to be always accessible need to be mirrored to all banks. This further limits the number of additional usable registers.

SUMMARY

According to an embodiment, a controller comprises a control unit operable to receive commands and data through an I/O interface; a plurality of registers arranged in a register block which is divided into a plurality of register banks, wherein at least one register controls a function of the controller; a register address unit comprising logic for accessing one of the plurality of registers by a plurality of addressing schemes, wherein the addressing schemes at least comprise a direct address provided by received data, a combined address provided by a partial address from a received command and a bank address stored in a bank register, and an address selected form a plurality of predetermined addresses through a received command.

According to a further embodiment, the bank register may be a single register with a single address in the register block. According to a further embodiment, the register address unit may comprise an address register coupled with the register bank for addressing the register bank. According to a further embodiment, the address register can be coupled with a controllable auto-increment unit. According to a further embodiment, the combined address can be generated by assembling the partial address and the bank address wherein the partial address form the least significant bits and the bank address the most significant bits of the combined address. According to a further embodiment, the combined address can be generated by adding the partial address to the bank address. According to a further embodiment, the address register can be coupled with an output of a first multiplexer receiving one of the predetermined addresses, the direct address, and the combined address. According to a further embodiment, the controller may comprise a second multiplexer receiving a plurality of bank addresses and outputting the bank address. According to a further embodiment, the I/O interface can be an SPI interface. According to a further embodiment, the controller can be an Ethernet controller.

According to another embodiment, a method of controlling the operation of a controller comprising a register bank with a plurality of registers, may comprise the steps of: receiving a command through an I/O interface; decoding the command and depending on the command determining an address by either receiving a direct address through the I/O interface, extracting a partial address from the command or selecting an address form a plurality of predetermined addresses through the command; in case of extracting a partial address, combining the partial address with a bank address stored in a bank register; and addressing the register bank using the address for read or write access.

According to a further embodiment, the bank register can be a single register with a single address in the register block. According to a further embodiment, the step of combining the partial address may comprise assembling the partial address and the bank address wherein the partial address form the least significant bits and the bank address the most significant bits of the combined address. According to a further embodiment, the step of combining the partial address may comprise adding the partial address to the bank address. According to a further embodiment, the step of decoding may comprise the step of decoding a write command and further comprises the steps of receiving data through the I/O interface wherein a first data is written to the register bank under the address and receiving further data through the I/O interface wherein the further data is written to the register bank after incrementing the address. According to a further embodiment, the step of receiving and writing further data can be repeated until a control signal is received through the I/O interface. According to a further embodiment, the control signal can be a chip select signal. According to a further embodiment, the step of decoding may comprise the step of decoding a read command and the method further may comprise the steps of transmitting data through the I/O interface wherein a first data is read from the register bank under the address and transmitted through the I/O interface, and reading further data from the register bank and transmitting the further data through the I/O interface wherein the further data is read from the register bank after incrementing the address. According to a further embodiment, the step of reading and transmitting further data can be repeated until a control signal is received through the I/O interface. According to a further embodiment, the control signal can be a chip select signal. According to a further embodiment, the I/O interface can be an SPI interface. According to a further embodiment, the controller can be an Ethernet controller.

Other technical advantages of the present disclosure will be readily apparent to one skilled in the art from the following figures, descriptions, and claims. Various embodiments of the present application may obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

DETAILED DESCRIPTION

Figure 1:
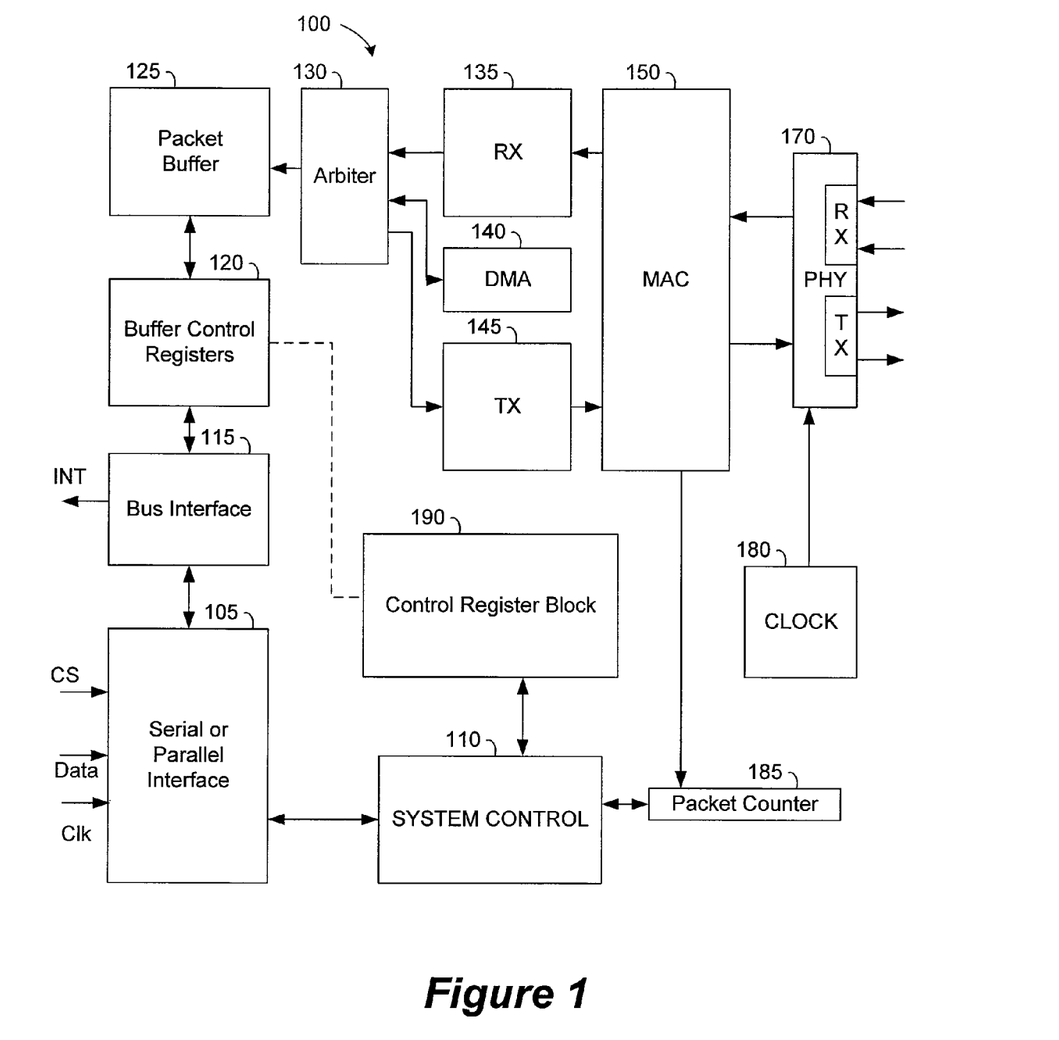
FIG. 1 is a block diagram of an Ethernet controller module as used in a stand alone Ethernet controller or an integrated module for a microcontroller.

FIG. 1 shows as an embodiment of a controller a block diagram of a Ethernet controller 100 that can be a stand alone Ethernet controller or an Ethernet controller module integrated, for example, in a microcontroller. The Ethernet controller 100 comprises a typical physical layer (PHY) 170 with transmit and receive units TX and RX for transmitting and receiving of the actual analog data over the network. This physical layer 170 is coupled with a media access control (MAC) data link layer 150 for implementing the actual Ethernet standard (IEEE 802.3). The Mac layer 150 is coupled with a receive unit 135 and a transmit unit 145 which may include respective filter units flow control and host interfaces. The Ethernet controller may also include a direct memory access (DMA) controller 140 capable of performing, for example, a checksum evaluation. An arbiter 130 may be implemented to switch coupling between the actual buffer 125 and the modules 135, 140, and 145. The buffer can be designed as a dual port buffer and, thus, also provides access by control registers to allow for interfaces with limited address capabilities to access the full range of the buffer. To this end, a plurality of address and data registers 120 may be provided to indirectly address the buffer 125. The buffer control registers 120 can be coupled with a bus interface 115 and a serial or parallel input/output (I/O) interface 105. The serial I/O interface can be, for example, a SPI interface or any other suitable inter circuit interface. Therefore, the I/O interface may comprise, for example, a chip select input pin CS, one or more data input/output pins, and a clock input pin. The bus interface 115 may also provide for additional interrupt signals to provide for additional control of the Ethernet controller 100.

The Ethernet controller 100 may be internally controlled by a system control unit 110 which controls the respective units of the Ethernet controller 100. Furthermore, a plurality of control registers 190 can be provided which are accessible through the interface 105 as will be explained in more detail below. Buffer access registers 120 can be a part of the control registers 190 (CRB) as indicated by the dotted line. Also, the MAC layer may include further registers that can be accessed through registers in the CRB. A packet counter 185 can be provided to count the number of transmitted packets. Mac layer 150 and/or transmit and receive logic 135 and 145 may be coupled with this packet counter for an automatic increment function. System control unit 110 may also be coupled with the packet counter to perform a software controlled decrement function on this counter. The counter value can be mapped to a special function register in the CRB.

System control unit 110 receives commands (opcodes) from the serial or parallel interface 105 and provides for decoding of these commands. The commands can provide for reading and writing of at least some or all registers thereby causing execution of certain functions of the respective controller. In particular, the system control 110 may provide for the respective control sequences to perform read and write access to the buffer 125 as will be explained in more detail below. Clock unit 160 provides for the required Ethernet transmission clock signal.

Figure 2A:
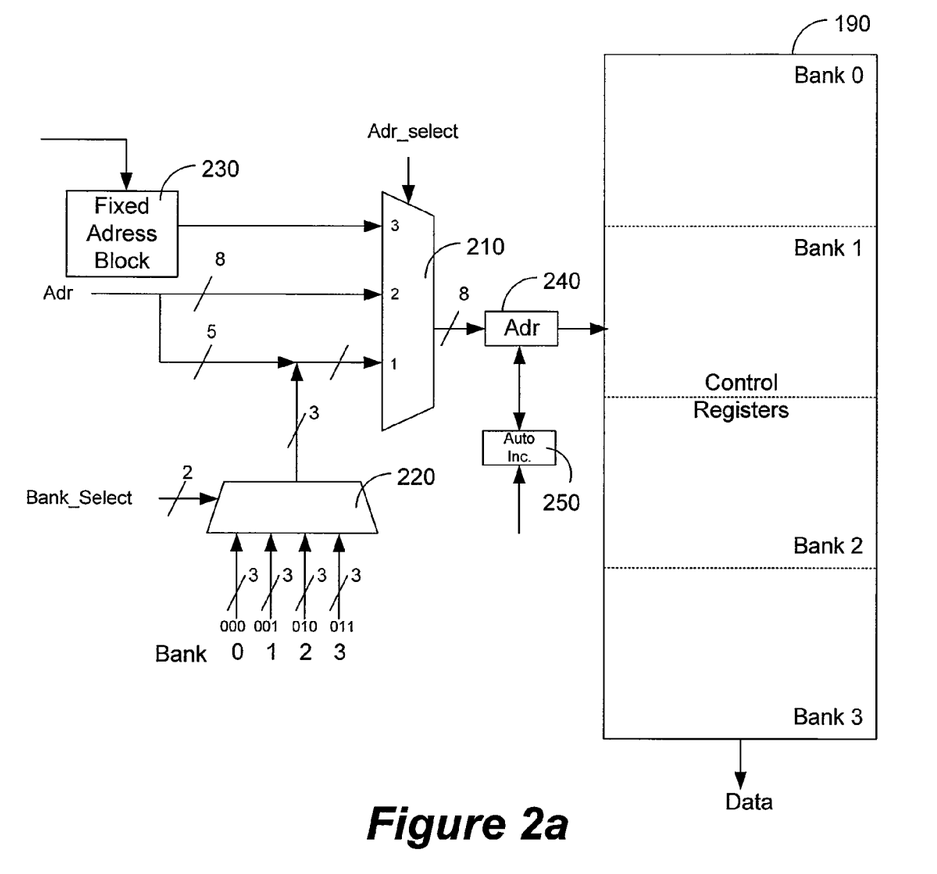
FIGS. 2a and 2b illustrate different embodiment of a control logic for accessing registers within an Ethernet controller.

FIG. 2a shows certain details of an embodiment of a control logic for accessing the plurality of registers for controlling the functionality of the Ethernet controller. The control register unit 190 is divided into four blocks. Each block may comprise, for example, 32 registers. Thus, unit 190 may comprise 128 different registers which can be addressed by a single byte. Any other distribution and number of registers is possible. The addressing logic shown in FIG. 2 allows for three different access methods. To this end multiplexer 210 comprises three different inputs, a select input Adr_Select and an output coupled with address register or latch 240 which is used to address register bank 190. Signal Adr_Select selects between the different access methods and is decoded from the command sent to the Ethernet controller. If Adr_Select selects input 1 as shown in FIG. 2, then addressing of control registers 190 is performed using the banking scheme. In this case, the command sent to the Ethernet controller 100 consists of a single opcode that contains the partial address of a register. A designated register in control register unit 190 controls multiplexer 220 to select one of, for example, four bank start addresses. These bank start addresses (000, 001, 010, 011) are used as the most significant bits and combined with the remaining lower least significant 5 bits of address signals Adr. The banking scheme according to this embodiment, thus, uses 5 bits provided by the command and fixed upper 3 bits selected by the bank register. According to this embodiment, 8 banks each having 32 register would be possible, even though the example shown in FIG. 2 only uses 4 banks. As will be appreciated by a person skilled in the art, depending on the design of the command byte or word, other bank structures can be defined. The bank register can be located in the control register block 190 and may be available at the same address in all banks. However, it can also be stored, for example, in fixed address block 230 or at any other suitable location.

In case Adr_Selct selects input 2, then the command comprises for example two bytes, the first byte being the opcode and the second byte the actual address of the register within control register unit 190. Even though only 128 registers or less are used in this embodiment, this scheme would allow for directly addressing up to 256 different registers in control register unit 190. Even though this type of addressing allows for every register to accessible, it requires 2 bytes to be transmitted to Ethernet controller 100 which may slow down operation.

In case Adr_Selct selects input 3, then a predetermined number of registers can be directly accessed via a single byte command. A plurality of registers such as a bank select register, flow control registers, interrupt control, etc. need to be accessible all the time. However, in time critical operations when access to registers is preferably performed through the banking scheme, such registers may not be directly accessible. Hence, as stated above, former Ethernet controllers provided for a mapping of such critical registers into each bank. However, this constitutes a waste of register space and reduces the number of registers significantly. Hence according to an embodiment, the most significant registers for operation have been identified and their addresses have been stored, for example, in block 230. Thus, for a limited subset of registers, 1 byte commands are provided for reading and/or writing access. The selection of these addresses from block 230 is performed by decoding of the respective 1 byte opcode transmitted to Ethernet controller 100. Any of these addressing schemes can be used to read/write or selectively set a bit in any of the addressable registers.

An auto-increment function can be implemented by coupling an auto-increment unit 250 with address register 240. Auto-increment unit 250 increments the address in register 240 after an access to register bank 190 has been completed. To this end, auto increment unit 250 may comprise a control input for activation and de-activation of this function. Furthermore, the auto-increment function may include a wrap around function which resets the address in register 240 to 0x0000 once the end address of register bank 190 has been reached.

As mentioned before, the buffer control registers 120 may be part of control register block 190. However, the control logic accessing the buffer control registers 120 may perform a different access function than for the other control registers depending on the command. When specific commands for reading or writing the buffer registers are sent to the Ethernet interface, the system control 110 accesses these registers as described above. However, when a packet read or write command is sent to the Ethernet interface, even though these registers can be selected in one of the different ways described, they are not addressed to perform a read/write function to the respective register but rather are used for indirect reading and writing the packet buffer. Hence, the control register access logic is designed to distinguish between different register access modes.

Figure 2B:
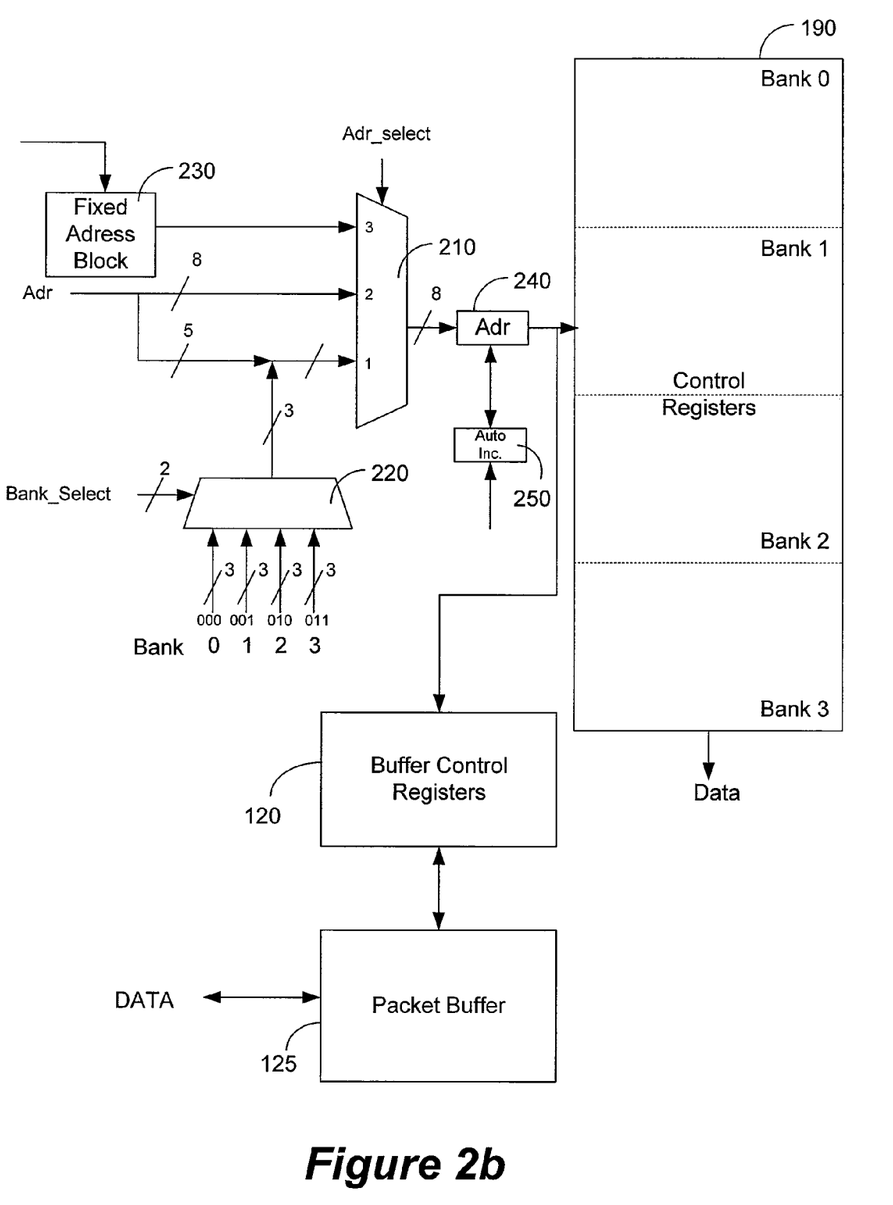

FIG. 2b shows an alternative embodiment, in which the buffer control registers 120 are separated from the control register block 190. This design may facilitate the access logic as all register which need only be directly addressed for a read/write function are consolidated in control register block 190 whereas registers that can be used for indirect access and for direct access are arranged in block 120. In one embodiment, these registers can be separated from the banking scheme, for example, by having a most significant address bits of "100." However, in another embodiment, these registers can be, for example, accessed through an additional fifth bank. As shown in FIG. 2b these registers can be the packet buffer address registers as explained in more detail below with respect to the specific op-codes for accessing the packet buffer 125.

Figure 4:
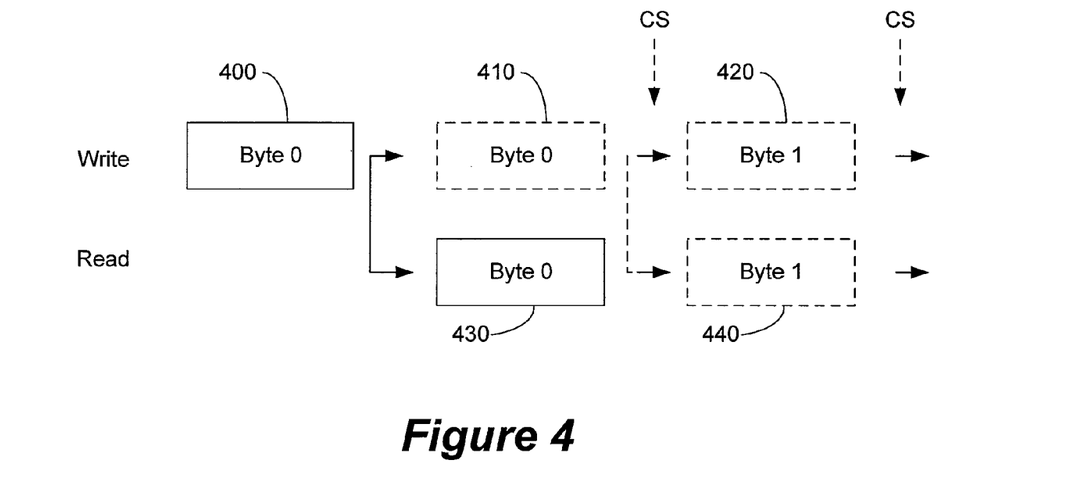
FIG. 4 shows the command/address/data flow from and to an Ethernet controller according to an embodiment.

Communication and control of the Ethernet controller through interface 105 is performed as shown in FIG. 4 by commands sent by the processor or microcontroller. To this end a first byte 400 (Byte0) is sent to the Ethernet controller. This Byte0 comprises the opcode and may also include a partial address. If the opcode encodes a write command, one or more bytes 410, 420 (Byte1, Byte2, etc.) may be sent in the following cycles to the interface. A plurality of write commands may operate with a burst mode in which data received at the interface is written into consecutive addresses wherein the start address is defined by the first address submitted in the Byte0 or Byte1. To end such an automatic burst mode, a control signal at the interface may be used to end such an automatic burst mode. For example, a chip select signal CS may be negated to indicate the end of a burst thus, single or multiple data transmissions can be performed following a respective command that triggers a burst transfer as indicated in FIG. 4.

If the opcode encodes a read command, one or more bytes 430, 440 (Byte1, Byte2, etc.) may be returned in the following cycles to the processor or microcontroller. Again, the chip select signal can be used to determine how many return data are sent back to the processor. As shown in FIG. 4, Byte0 is used to transmit the read opcode. In case of an embedded address in Byte0, the next byte 430 will be transmitted from the Ethernet controller 100 to the processor or microcontroller. In case of a long address, Byte1 transmitted to Ethernet controller 100 comprises the address and Byte2 will be the first data returned from Ethernet controller 100. Depending on when the chip select signal is negated by the processor or microcontroller, one or multiple data are returned by Ethernet controller 100. For some commands, the auto-increment function automatically increments the originally submitted address. However, some commands may require to specifically select and auto-increment function. Thus, Ethernet controller 100 may transmit data from a constant address in a burst mode.

The following describes various exemplary commands, their structure and their function. All exemplary commands are also summarized in the following tables 1-3.

Figure 3:
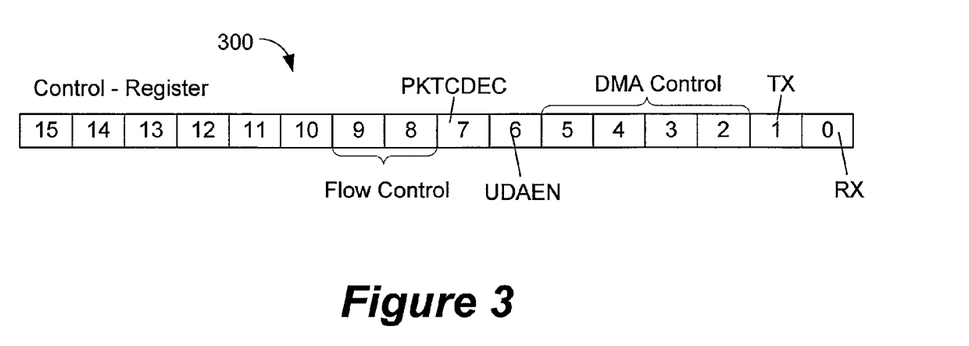
FIG. 3 shows an exemplary control register according to an embodiment.

First, the operation of all opcodes that set/clear special function register bits will be described. FIG. 3 shows as an example a control register 300 controlling certain operations of the Ethernet controller. The functionality of certain bits will be explained in combination with respective opcodes. These opcodes may include:

Reset Opcode

This opcode sets the control register bit (SOFTRST) in a configuration register, which causes a soft Reset of the device.

FCDIS Opcode

This opcode sets two register bits 8 and 9 in control register 300 to 00 (FCDISABLE mode) to disable flow control.

FCSINGLE Opcode

This opcode sets the two register bits 8 and 9 in control register 300 to 01 (FCSINGLE mode) to enable flow control for a single transmission.

FCMULTIPLE Opcode

This opcode sets the two register bits 8 and 9 in control register 300 to 10 (FCMULTIPLE mode) to enable flow control for multiple transmissions.

FCCLEAR Opcode

This opcode sets the two register bits 8 and 9 in control register 300 to 11 (FCCLEAR mode) to stop flow control.

WPKTCDEC Opcode

This opcode sets the PKTCDEC register bit 7 in control register 300, which causes the Packet Counter to decrement.

UDAEN Opcode

This opcode sets the UDAEN register bit 6 in control register 300, which enables address wrap-around in the User Defined Area.

UDADIS Opcode

This opcode clears the UDAEN register bit 6 in control register 300, which disables address wrap-around in the User Defined Area.

DMACOPY Opcode

This opcode sets three DMA control register bits 3, 4, 5 in the control register 300 to 110, which will start a DMA Copy Operation with an initial checksum value of $0000.

DMACOPYU Opcode

This opcode sets three DMA control register bits 3, 4, 5 in the control register 300 to 111, which will start a DMA Copy Operation with the initial checksum value loaded from an ECKSUM register.

DMACKSUM Opcode

This opcode sets three DMA control register bits 3, 4, 5 in the control register 300 to 100, which will start a DMA Checksum Only Operation with an initial checksum value of $0000.

DMACKSUMU Opcode

This opcode sets three DMA control register bits 3, 4, 5 in the control register 300 to 101, which starts a DMA Checksum Only Operation with the initial checksum value loaded from the ECKSUM register.

DMASTOP Opcode

This opcode clears a DMASTART register bit 2 in control register 300, which terminates the current DMA operation.

TXSTART Opcode

This opcode sets a TXRTS register bit 1 in control register 300, which starts transmission of a packet.

TXSTOP Opcode

This opcode clears the TXRTS register bit 1 in control register 300, which terminates transmission of a packet.

RXSTART Opcode

This opcode sets a RXEN register bit 0 in control register 300, which enables reception of packets.

RXSTOP Opcode

This opcode clears the RXEN register bit 0 in control register 300, which enables reception of packets.

SETIRQIE Opcode

This opcode sets a IRQIE register bit in an interrupt control register, which enables interrupts.

CLRIRQIE Opcode

This opcode clears the IRQIE register bit in an interrupt control register, which disables interrupts.

Next, the operation of all opcodes that read or write the internal Bank Select register (BANKSEL[1:0]) is described. These opcodes may includes:

B0SEL, B1SEL, B2SEL, B3SEL, for selecting one of the four banks and RBSEL for reading which bank is currently selected. A Bank Select WRITE command can be performed when Opcode[7:3]=5'b11000 is sent to the Ethernet controller, and the value to be written is in Opcode[2:1]. This allows for decoding of the Bank Select WRITE opcodes with a single byte and without the requirement of mirroring the bank select register to all banks. Through this command, the respective select register can be directly accessed with a single byte command independent on what bank has been selected.

Next, the operation of all opcodes that read or write the SFR registers is described.

RCR Opcode

This opcode reads from the CRB/MAC register pointed to by the Bank Select register and the address in Byte0 (Address [4:0]). The read data is returned in the next byte, and the internal SFR address register is incremented by one. To only receive a single register content, this command must be terminated by negating the chip select (CSn) pin. Otherwise, the next byte returned will be Address[4:0]+1, and then Address [4:0]+2, etc. Once Address[4:0] reaches $FF, it will roll back to $00 without affecting the Bank Select register.

RCRU Opcode

This opcode reads from the CRB/MAC registers without using the Bank Select register. Byte1 contains the full 7-bit register address of the register. The read data is returned in the next byte, and the internal SFR address register is incremented by 1. To only receive a single register content, this command must be terminated by negating the chip select (CSn) pin. Otherwise, the next byte returned will be Address [4:0]+1, and then Address[4:0]+2, etc. Once Address[4:0] reaches $FF, it will roll back to $00 without affecting the Bank Select register.

WCR Opcode

This opcode writes to the CRB/MAC register pointed to by the Bank Select register and the address in Byte0 (Address [4:0]). The write data is presented in the next byte, and the internal SFR address register is incremented by one. To only transmit a single register content, this command must be terminated by negating the chip select (CSn) pin. Otherwise, the next byte written will be Address[4:0]+1, and then Address[4:0]+2, etc. Once Address[4:0] reaches $FF, it will roll back to $00 without affecting the Bank Select register.

WCRU Opcode

This opcode writes to the CRB/MAC registers without using the Bank Select register. Byte1 contains the full 7-bit register address of the register. The write data is presented in the next byte, and the internal SFR address register is incremented by one. To only transmit a single register content, this command must be terminated by negating the chip select (CSn) pin. Otherwise, the next byte written will be Address [7:0]+1, and then Address[7:0]+2, etc. Once Address[7:0] reaches $FF, it will roll back to $00 without affecting the Bank Select register.

BFS Opcode

This opcode sets individual bits in the CRB register pointed to by the Bank Select register and the address in Byte0 (Address[4:0]). The set mask is presented in the next byte, and the internal SFR address register is incremented by one. To only mask a single register content, this command must be terminated by negating the chip select (CSn) pin. Otherwise, the next byte modified will be Address[4:0]+1, and then Address [4:0]+2, etc. Once Address[4:0] reaches $FF, it will roll back to $00 without affecting the Bank Select register.

BFSU Opcode

This opcode sets individual bits in the CRB register without using the Bank Select register. Byte1 contains the full 7-bit register address of the register. The set mask is presented in the next byte, and the internal SFR address register is incremented by one. To only set bits in a single register content, this command must be terminated by negating the chip select (CSn) pin. Otherwise, he next byte modified will be Address[7:0]+1, and then Address[7:0]+2, etc. Once Address[7:0] reaches $FF, it will roll back to $00 without affecting the Bank Select register.

BFC Opcode

This opcode clears individual bits in the CRB register pointed to by the Bank Select register and the address in Byte0 (Address[4:0]). The clear mask is presented in the next byte, and the internal SFR address register is incremented by one. To only transmit a clear mask in a single register content, this command must be terminated by negating the chip select (CSn) pin. Otherwise, the next byte modified will be Address [4:0]+1, and then Address[4:0]+2, etc. Once Address[4:0] reaches $FF, it will roll back to $00 without affecting the Bank Select register.

BFCU Opcode

This opcode clears individual bits in the CRB register without using the Bank Select register. Byte1 contains the full 7-bit register address of the register. The clear mask is presented in the next byte, and the internal SFR address register is incremented by one. To only transmit a clear mask for a single register content, this command must be terminated by negating the chip select (CSn) pin. Otherwise, the next byte modified will be Address[7:0]+1, and then Address[7:0]+2, etc. Once Address[7:0] reaches $FF, it will roll back to $00 without affecting the Bank Select register.

The fundamental difference between the opcodes RCR/WCR/BFS/BFC and the RCRU/WCRU/BFSU/BFCU opcodes is the address format. With the RCR/WCR/BFS//BFC opcodes, the internal BANKSEL[1:0] register drives bits 6:5 of the SFR register address. With the RCRU/WCRU/BFSU/BFCU opcodes, the full 7-bit address is passed in the first byte after the opcode, requiring no bank switching. Next, the operation of all opcodes that read or write the packet buffer are explained.

RBMTX Opcode

This opcode performs a read from the Packet Buffer at the address pointed to by the ETXRDP register. If Address Auto-Increment is enabled, the ETXRDP register will be updated after the read is performed, as follows: If the read address is equal to the TX Buffer End Address, the TX Buffer Start Address will be loaded into ETXRDP register. If the read address is equal to $FFFF, ETXRDP will roll to $0000 after the read is performed. Otherwise, the ETXRDP register will be incremented by one. If an Address Auto-Increment is not enabled, the contents of the ETXRDP register will remain unchanged. As long as the chip select pin is asserted, this command is in effect, thereby allowing bursting of data from the Packet Buffer as explained above.

RBMRX Opcode

This opcode performs a read from the Packet Buffer at the address pointed to by the ERXRDP register. If Address Auto-Increment is enabled, the ERXRDP register will be updated after the read is performed as follows: If the read address is equal to the RX Buffer End Address, the RX Buffer Start Address will be loaded into ERXRDP register. If the read address is equal to $FFFF, ERXRDP will roll to $0000 after the read is performed. Otherwise, the ERXRDP register will be incremented by one. If Address Auto-Increment is not enabled, the contents of the ERXRDP register will remain unchanged. As long as the chip select pin is asserted, this command is in effect, thereby allowing bursting of data from the Packet Buffer.

RBMUDA Opcode

This opcode performs a read from the Packet Buffer at the address pointed to by the EUDARDP register. If Address Auto-Increment is enabled, the EUDARDP register will be updated after the read is performed, as follows: If the read address is equal to the User Defined Area End Address, the User Defined Area Start Address will be loaded into ETXRDP register. If the read address is equal to $FFFF, EUDARDP will roll to $0000 after the read is performed. Otherwise, the EUDARDP register will be incremented by one. If Address Auto-Increment is not enabled, the contents of the EUDARDP register will remain unchanged. As long as the chip select pin is asserted, this command is in effect, thereby allowing bursting of data from the Packet Buffer. Again, this command must be terminated by negating the chip select (CSn) pin.

WBMTX Opcode

This opcode performs a write to the Packet Buffer at the address pointed to by the ETXWRP register. If Address Auto-Increment is enabled, the ETXWRP register will be updated after the read is performed, as follows: If the write address is equal to the TX Buffer End Address, the TX Buffer Start Address will be loaded into ETXWRP register. If the write address is equal to $FFFF, ETXWRP will roll to $0000 after the write is performed. Otherwise, the ETXRDP register will be incremented by one. If Address Auto-Increment is not enabled, the contents of the ETXWRP register will remain unchanged. As long as the chip select pin is asserted, this command is in effect, thereby allowing bursting of data into the Packet Buffer. Again, this command must be terminated by negating the chip select (CSn) pin.

WBMRX Opcode

This opcode performs a write to the Packet Buffer at the address pointed to by the ERXWRP register. If Address Auto-Increment is enabled, the ERXWRP register will be updated after the read is performed, as follows: If the write address is equal to the RX Buffer End Address, the RX Buffer Start Address will be loaded into ERXWRP register. If the write address is equal to $FFFF, ERXWRP will roll to $0000 after the write is performed. Otherwise, the ERXRDP register will be incremented by one. If Address Auto-Increment is not enabled, the contents of the ERXWRP register will remain unchanged. As long as the chip select pin is asserted, this command is in effect, thereby allowing bursting of data into the Packet Buffer. Again, this command must be terminated by negating the chip select (CSn) pin.

WBMUDA Opcode

This opcode performs a write to the Packet Buffer at the address pointed to by the EUDAWRP register. If Address Auto-Increment is enabled, the EUDAWRP register will be updated after the read is performed, as follows: If the write address is equal to the User Defined Area End Address, the User Defined Area Start Address will be loaded into EUDAWRP register. If the write address is equal to $FFFF, EUDAWRP will roll to $0000 after the write is performed. Otherwise, the EUDARDP register will be incremented by one. If Address Auto-Increment is not enabled, the contents of the EUDAWRP register will remain unchanged. As long as the chip select pin is asserted, this command is in effect, thereby allowing bursting of data into the Packet Buffer. Again, this command must be terminated by negating the chip select (CSn) pin.

Next, the operation of all opcodes that read or write the packet buffer pointer registers: (ETXRDP[PKT_ADDR_MSB:0], ETXWRP[PKT_ADDR_MSB:0], ERXRDP[PKT_ADDR_MSB:0], ERXWRP[PKT_ADDR_MSB:0], EUDARDP[PKT_ADDR_MSB:0], EUDAWRP[PKT_ADDR_MSB:0]) are described.

WTXRDP Opcode

This opcode is used to change the contents of the ETXRDP register. Byte1 is written into ETXRDPL, and must always be present. If Byte2 is present, it is written into ETXRDPH. If no Byte2 is required, then the chip select pin must be negated after Byte1. The next byte after the negation of the chip select or after Byte2 is considered a new command.

RTXRDP Opcode

This opcode is used to read back the contents of the ETXRDP register. Byte1 contains the contents of ETXRDPL, and must always be present. If Byte2 is present, it contains the contents of ETXRDPH. If no Byte2 is required, then the chip select pin must be negated after Byte1. The next byte after the negation of the chip select or after Byte2 is considered a new command.

WRXRDP Opcode

This opcode is used to change the contents of the ERXRDP register. Byte1 is written into ERXRDPL, and must always be present. If Byte2 is present, it is written into ERXRDPH. If no Byte2 is required, then the chip select pin must be negated after Byte1. The next byte after the negation of the chip select or after Byte2 is considered a new command.

RRXRDP Opcode

This opcode is used to read back the contents of the ERXRDP register. Byte1 contains the contents of ERXRDPL, and must always be present. If Byte2 is present, it contains the contents of ERXRDPH. If no Byte2 is required, then the chip select pin must be negated after Byte1. The next byte after the negation of the chip select or after Byte2 is considered a new command.

WUDARDP Opcode

This opcode is used to change the contents of the EUDARDP register. Byte1 is written into EUDARDPL, and must always be present. If Byte2 is present, it is written into EUDARDPH. If no Byte2 is required, then the chip select pin must be negated after Byte1. The next byte after the negation of the chip select or after Byte2 is considered a new command.

RUDARDP Opcode

This opcode is used to read back the contents of the EUDARDP register. Byte1 contains the contents of EUDARDPL, and must always be present. If Byte2 is present, it contains the contents of EUDARDPH. If no Byte2 is required, then the chip select pin must be negated after Byte1. The next byte after the negation of the chip select or after Byte2 is considered a new command.

WTXWRP Opcode

This opcode is used to change the contents of the ETXWRP register. Byte1 is written into ETXWRPL, and must always be present. If Byte2 is present, it is written into ETXWRPH. If no Byte2 is required, then the chip select pin must be negated after Byte1. The next byte after the negation of the chip select or after Byte2 is considered a new command.

RTXWRP Opcode

This opcode is used to read back the contents of the ETXWRP register. Byte1 contains the contents of ETXWRPL, and must always be present. If Byte2 is present, it contains the contents of ETXWRPH. If no Byte2 is required, then the chip select pin must be negated after Byte1. The next byte after the negation of the chip select or after Byte2 is considered a new command.

WRXWRP Opcode

This opcode is used to change the contents of the ERXWRP register. Byte1 is written into ERXWRPL, and must always be present. If Byte2 is present, it is written into ERXWRPH. If no Byte2 is required, then the chip select pin must be negated after Byte1. The next byte after the negation of the chip select or after Byte2 is considered a new command.

RRXWRP Opcode

This opcode is used to read back the contents of the ERXWRP register. Byte1 contains the contents of ERXWRPL, and must always be present. If Byte2 is present, it contains the contents of ERXWRPH. If no Byte2 is required, then the chip select pin must be negated after Byte1. The next byte after the negation of the chip select or after Byte2 is considered a new command.

WUDAWRP Opcode

This opcode is used to change the contents of the EUDAWRP register. Byte1 is written into EUDAWRPL, and must always be present. If Byte2 is present, it is written into EUDAWRPH. If no Byte2 is required, then the chip select pin must be negated after Byte1. The next byte after the negation of the chip select or after Byte2 is considered a new command.

RUDAWRP Opcode

This opcode is used to read back the contents of the EUDAWRP register. Byte1 contains the contents of EUDAWRPL, and must always be present. If Byte2 is present, it contains the contents of EUDAWRPH. If no Byte2 is required, then the chip select pin must be negated after Byte1. The next byte after the negation of the chip select or after Byte2 is considered a new command.

DEBUGFSM Opcode

This opcode returns a snapshot of the internal state machines, and may be used only for factory debug and testing. If no Byte2 or Byte3 is required, then the chip select pin must be negated after Byte1 or Byte2, respectively. The next byte after the negation of the chip select or after Byte3 is considered a new command.

TABLE 1

| Opcode | Byte 0 Opcode[2:0] | Byte 0 Address[4:0] | Write Data Byte 1 | Write Data Byte 2 | Write Data Byte N | Read Data Byte 1 | Read Data Byte 2 | Read Data Byte 3 | Read Data Byte N | Description |
|---|---|---|---|---|---|---|---|---|---|---|
| RCR | 3'b000 | Register Address | — | — | — | Read data | Read data (Optional) | Read data (Optional) | Read data (Optional) | Read Control Register |
| WCR | 3'b010 | Register Address | Write data | Write data (Optional) | Write data (Optional) | — | — | — | — | Write Control Register |
| RCRU | 8'b00100000 | | Full Register Address | — | — | Read data | Read data (Optional) | Read data (Optional) | Read data (Optional) | Read Control Register (Unbanked) |
| WCRU | 8'b00100010 | | Full Register Address | Write data | Write data (Optional) | — | — | — | — | Write Control Register (Unbanked) |
| BFS | 3'b100 | Address Register | SET Mask | SET Mask (Optional) | SET Mask (Optional) | — | — | — | — | Bit Field Set |
| BFSU | 8'b00100100 | | Full Register Address | SET Mask | SET Mask (Optional) | — | — | — | — | Bit Field Set (Unbanked) |
| BFC | 3'b101 | Register Address | CLR Mask | CLR Mask (Optional) | CLR Mask (Optional) | — | — | — | — | Bit Field Clear |
| BFCU | 8'b00100110 | | Full Register Address | CLR Mask | CLR Mask (Optional) | — | — | — | — | Bit Field Clear (Unbanked) |

TABLE 1-continued

| Opcode | Byte 0 Opcode[2:0] Address[4:0] | Write Data Byte 1 | Byte 2 | Byte N | Read Data Byte 1 | Byte 2 | Byte 3 | Byte N | Description |
|---|---|---|---|---|---|---|---|---|---|
| RBMTX | 8'b00101000 | — | — | — | Read data | Read data (Optional) | Read data (Optional) | Read data (Optional) | Read the Buffer Memory from the address specified in the ETXRDP register |
| WBMTX | 8'b00101010 | Write data | Write data (Optional) | Write data (Optional) | — | — | — | — | Write the Buffer Memory from the address specified in the ETXWRP register |
| RBMRX | 8'b00101100 | — | — | — | Read data | Read data (Optional) | Read data (Optional) | Read data (Optional) | Read the Buffer Memory from the address specified in the ERXRDP register |
| WBMRX | 8'b00101110 | Write data | Write data (Optional) | Write data (Optional) | — | — | — | — | Write the Buffer Memory from the address specified in the ERXWRP register |
| RBMUDA | 8'b00110000 | — | — | — | Read data | Read data (Optional) | Read data (Optional) | Read data (Optional) | Read the Buffer Memory from the address specified in the EUDARDP register |
| WBMUDA | 8'b00110010 | Write data | Write data (Optional) | Write data (Optional) | — | — | — | — | Write the Buffer Memory from the address specified in the EUDAWRP register |
| Reserved | 8'b00110100 8'b00110110 8'b00111000 8'b00111010 8'b00111100 8'b00111110 | — | — | — | — | — | — | — | No Operation |

TABLE 2

| Opcode | Byte 0 Opcode[7:0] | Write Data Byte 1 | Byte 2 | Byte N | Read Data Byte 1 | Byte 2 | Byte 3 | Byte N | Description |
|---|---|---|---|---|---|---|---|---|---|
| WTXRDP | 8'b01100000 | ETXRDPL | ETXRDPH (Optional) | — | — | — | — | — | Write the ETXRDP register |
| RTXRDP | 8'b01100010 | — | — | — | ETXRDPL | ETXRDPH (Optional) | register | — | Read the ETXRDP register |
| WRXRDP | 8'b01100100 | ERXRDPL | ERXRDPH (Optional) | — | — | — | — | — | Write the ERXRDP register |
| RRXRDP | 8'b01100110 | — | — | — | ERXRDPL | ERXRDPH (Optional) | register | — | Read the ERXRDP register |
| WUDARDP | 8'b01101000 | EUDARDPL | EUDARDPH (Optional) | — | — | — | — | — | Write the EUDARDP register |
| RUDAWRP | 8'b01101010 | — | — | — | EUDARDPL | EUDARDPH (Optional) | register | — | Read the EUDARDP register |
| WTXWRP | 8'b01101100 | ETXWRPL | ETXWRPH (Optional) | — | — | — | — | — | Write the ETXWRP register |
| RTXWRP | 8'b01101110 | — | — | — | ETXWRPL | ETXWRPH (Optional) | register | — | Read the ETXWRP register |
| WRXWRP | 8'b01110000 | ERXWRPL | ERXWRPH (Optional) | — | — | — | — | — | Write the ERXWRP register |
| RRXWRP | 8'b01110010 | — | — | — | ERXWRPL | ERXWRPH (Optional) | register | — | Read the ERXWRP register |
| WUDAWRP | 8'b01110100 | EUDAWRPL | EUDAWRPH (Optional) | — | — | — | — | — | Write the EUDAWRP register |
| RUDAWRP | 8'b01110110 | — | — | — | EUDAWRPL | EUDAWRPH (Optional) | register | — | Read the EUDAWRP register |
| DEBUGFSM | 8'b01111000 | — | — | — | Read data | Read data | Read data | Read data (Byte4) | Read FSM state (Factory Use Only) |
| Reserved | 8'b01111010 8'b01111100 8'b01111110 | — | — | — | — | — | — | — | No Operation |

TABLE 3

| Opcode | Byte 0 Opcode[7:0] | Write Data Byte 1 | Byte 2 | Byte N | Read Data Byte 1 | Byte 2 | Byte 3 | Byte N | Description |
|---|---|---|---|---|---|---|---|---|---|
| Fixed Length Opcodes (No need to deassert chip select between commands) | | | | | | | | | |
| B0SEL | 8'b11000000 | — | — | — | — | — | — | — | Register Bank 0 Select |
| B1SEL | 8'b11000010 | — | — | — | — | — | — | — | Register Bank 1 Select |
| B2SEL | 8'b11000100 | — | — | — | — | — | — | — | Register Bank 2 Select |
| B3SEL | 8'b11000110 | — | — | — | — | — | — | — | Register Bank 3 Select |
| RBSEL | 8'b11001000 | — | — | — | Read data | — | — | — | Read Current Bank Select |
| RESET | 8'b11001010 | — | — | — | — | — | — | — | Soft Reset - Set ECFG[2] |
| FCDIS | 8'b11100000 | — | — | — | — | — | — | — | Flow Control OFF - Set ECTRL[9:8] = 00 |
| FCSINGLE | 8'b11100010 | — | — | — | — | — | — | — | Flow Control SINGLE - Set ECTRL[9:8] = 01 |
| FCMULTIPLE | 8'b11100100 | — | — | — | — | — | — | — | Flow Control MULTIPLE - Set ECTRL[9:8] = 10 |
| FCCLEAR | 8'b11100110 | — | — | — | — | — | — | — | Flow Control CLEAR - Set ECTRL[9:8] = 11 |
| WPKTCDEC | 8'b11001100 | — | — | — | — | — | — | — | Decrement Packet Counter - Set ECTRL[7] |
| UDAEN | 8'b11001110 | — | — | — | — | — | — | — | Enable User Defined Area - Set ECTRL[6] |
| UDADIS | 8'b11010000 | — | — | — | — | — | — | — | Disable User Defined Area - Clear ECTRL[6] |
| DMASTOP | 8'b11010010 | — | — | — | — | — | — | — | Stop Current DMA Operation - Clear ECTRL[5] |
| DMACKSUM | 8'b11011000 | — | — | — | — | — | — | — | Start DMA Checksum Only Operation - Set ECTRL[5:3] = 100 |
| DMACKSUMU | 8'b11011010 | — | — | — | — | — | — | — | Start DMA Checksum Only Operation with User Checksum Seed - Set ECTRL[5:3] = 101 |
| DMACOPY | 8'b11011100 | — | — | — | — | — | — | — | Start DMA Copy Operation - Set ECTRL[5:3] = 110 |
| DMACOPYU | 8'b11011110 | — | — | — | — | — | — | — | Start DMA Copy Operation with User Checksum Seed - Set ECTRL[5:3] = 111 |
| TXSTART | 8'b11010100 | — | — | — | — | — | — | — | Start TX Transfer - Set ECTRL[1] |
| TXSTOP | 8'b11010110 | — | — | — | — | — | — | — | Stop TX Transfer - Clear ECTRL[1] |
| RXSTART | 8'b11101000 | — | — | — | — | — | — | — | Enable RX Transfer - Set ECTRL[0] |
| RXSTOP | 8'b11101010 | — | — | — | — | — | — | — | Disable RX Transfer - Clear ECTRL[0] |
| SETIRQIE | 8'b11101100 | — | — | — | — | — | — | — | Enable Interrupts - Set IRQIE[15] |
| CLRIRQIE | 8'b11101110 | — | — | — | — | — | — | — | Disable Interrupts - Clear IRQIE[15] |

The described access scheme for registers arranged within a register bank and used to control the functionality has been explained in combination with an Ethernet controller that can be controlled through an I/O interface by an external microcontroller or processor. However, the invention is not restricted to Ethernet controllers but can be used in other types of stand alone controllers that are controlled via an I/O interface such as, for example, a SPI interface.

What is claimed is:

1. A controller comprising:
a control unit operable to receive commands and data through an I/O interface, wherein the commands comprise an instruction to read or write data from or to an internal register block of said controller;
a plurality of registers arranged in the register block which is divided into a plurality of register banks, wherein at least one register controls a function of the controller;
a register address unit comprising logic for accessing one of the plurality of registers by a plurality of addressing schemes, wherein the addressing schemes at least comprise a direct address provided by received data, a combined address provided by a partial address from a received command and a bank address stored in a bank register, and an address selected form a plurality of predetermined addresses through a received command.

2. The controller according to claim 1, wherein the bank register is a single register with a single address in the register block.

3. The controller according to claim 1, wherein the register address unit comprises an address register coupled with the register bank for addressing the register bank.

4. The controller according to claim 3, wherein the address register is coupled with a controllable auto-increment unit.

5. The controller according to claim 3, wherein the address register is coupled with an output of a first multiplexer receiving one of the predetermined addresses, the direct address, and the combined address.

6. The controller according to claim 5, further comprising a second multiplexer receiving a plurality of bank addresses and outputting the bank address.

7. The controller according to claim 1, wherein the combined address is generated by assembling the partial address and the bank address wherein the partial address form the least significant bits and the bank address the most significant bits of the combined address.

8. The controller according to claim 1, wherein the combined address is generated by adding the partial address to the bank address.

9. The controller according to claim 1, wherein the I/O interface is an SPI interface.

10. The controller according to claim 1, wherein the controller is an Ethernet controller.

11. A method of controlling the operation of a controller comprising a register bank with a plurality of registers, the method comprising the steps of:
receiving a command through an I/O interface;
decoding the command and depending on the command determining an address by either receiving a direct address through the I/O interface, extracting a partial address from the command or selecting an address from a plurality of predetermined addresses through the command;
in case of extracting a partial address, combining the partial address with a bank address stored in a bank register;
addressing the register bank using the address for read or write access.

12. The method according to claim 11, wherein the bank register is a single register with a single address in the register block.

13. The method according to claim 11, wherein the step of combining the partial address comprises assembling the partial address and the bank address wherein the partial address form the least significant bits and the bank address the most significant bits of the combined address.

14. The method according to claim 11, wherein the step of combining the partial address comprises adding the partial address to the bank address.

15. The method according to claim 11, wherein the step of decoding comprises the step of decoding a write command and further comprises the steps of receiving data through the I/O interface wherein a first data is written to the register bank under the address and receiving further data through the I/O interface wherein the further data is written to the register bank after incrementing the address.

16. The method according to claim 15, wherein the step of receiving and writing further data is repeated until a control signal is received through the I/O interface.

17. The method according to claim 16, wherein the control signal is a chip select signal.

18. The method according to claim 11, wherein the step of decoding comprises the step of decoding a read command and the method further comprises the steps of transmitting data through the I/O interface wherein a first data is read from the register bank under the address and transmitted through the I/O interface, and
reading further data from the register bank and transmitting the further data through the I/O interface wherein the further data is read from the register bank after incrementing the address.

19. The method according to claim 18, wherein the step of reading and transmitting further data is repeated until a control signal is received through the I/O interface.

20. The method according to claim 19, wherein the control signal is a chip select signal.

21. The method according to claim 11, wherein the I/O interface is an SPI interface.

22. The method according to claim 11, wherein the controller is an Ethernet controller.

23. An Ethernet controller comprising:
a control unit operable to receive commands and data through a SPI interface;
a plurality of registers arranged in a register block which is divided into a plurality of register banks, wherein at least one register controls the operation of the controller;
register address unit comprising logic for accessing one of the plurality of registers by a plurality of addressing schemes, wherein the addressing schemes at least comprise a direct address provided by received data, combined address provided by a partial address from a received command and a bank address stored in a bank register, and selecting an address form a plurality of predetermined addresses through a received command, wherein the bank register is a single register with a single address in the register block.

24. The controller according to claim 23, wherein the register address unit comprises an address register coupled with the register bank for addressing the register bank and wherein the address register is coupled with a controllable auto-increment unit.

25. The controller according to claim 24, wherein the address register is coupled with an output of a first multiplexer receiving one of the predetermined addresses, the direct address, and the combined address.

* * * * *